UNITED STATES PATENT OFFICE.

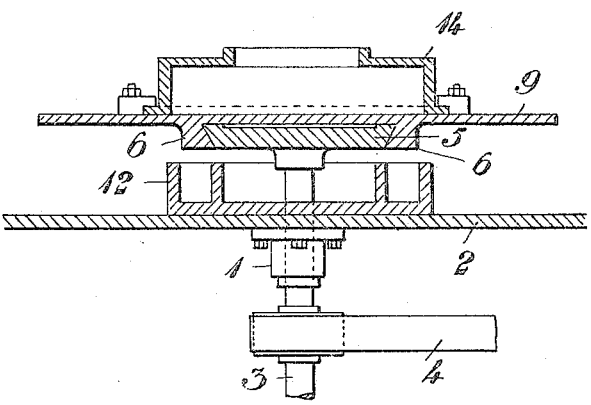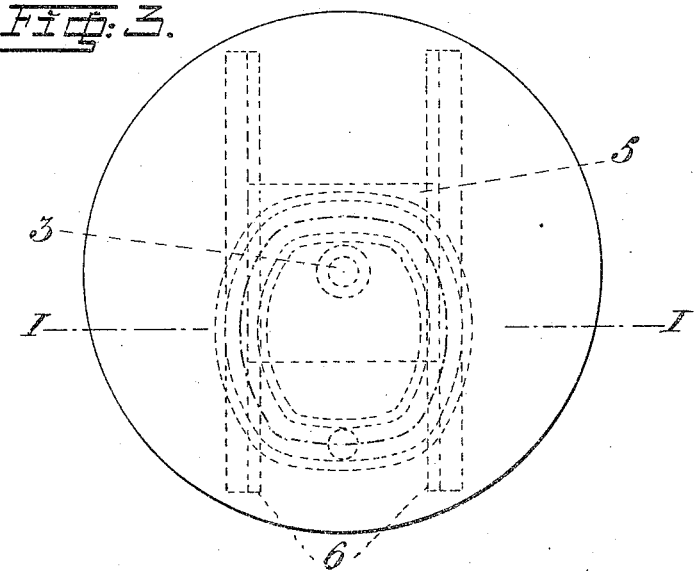

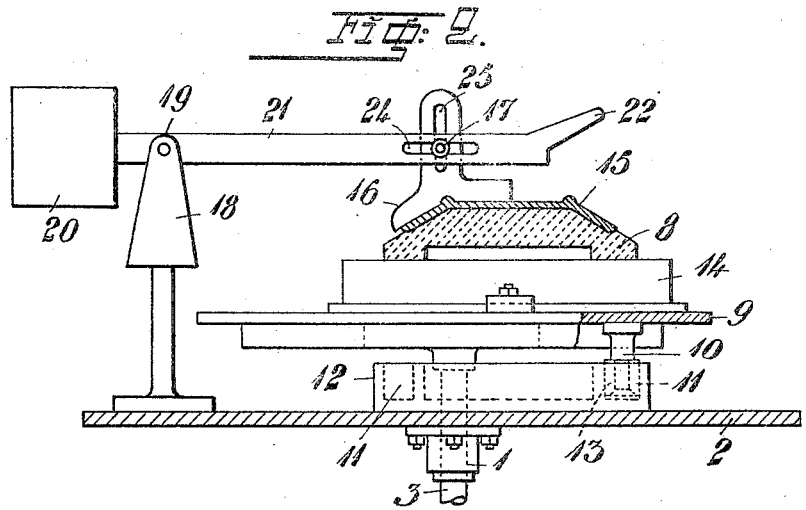
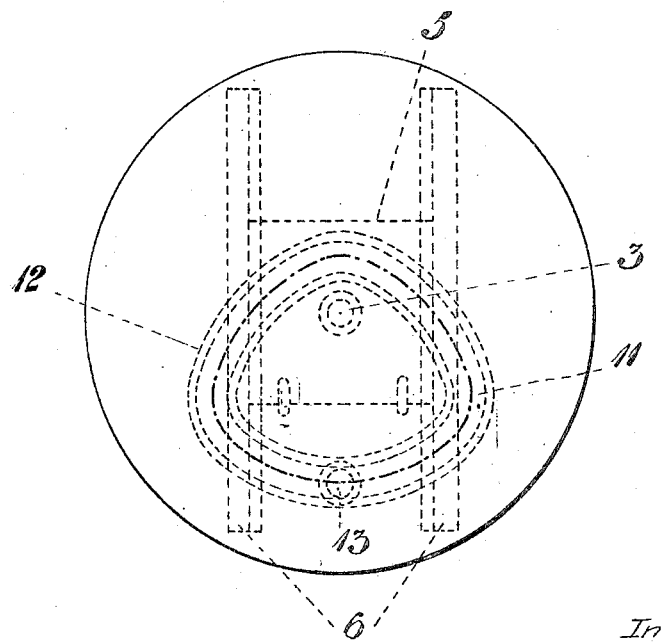

AXEL SAMUEL WILHELM ODELBERG, OF GUSTAFSBERG, SWEDEN, ASSIGNOR TO AKTIEBOLAGET GUSTAFSBERGS FABRIKS INTRESSENTER, OF GUSTAFSBERG, SWEDEN, A JOINT-STOCK COMPANY LIMITED.

MACHINERY FOR THE MOLDING OF POTTERY.

1,377,785.   Specification of Letters Patent.   Patented May 10, 1921.

Application filed July 27, 1920. Serial No. 399,317.

*To all whom it may concern:*

Be it known that I, AXEL SAMUEL WILHELM ODELBERG, civil engineer, subject of the King of Sweden, residing at Gustafsberg, in the Kingdom of Sweden, have invented new and useful Improvements in Machinery for the Molding of Pottery, of which the following is a specification.

The present invention relates to improvements in machinery for the molding ("jollying") of pottery.

The invention renders it possible in a very simple manner to mold non-round, *e. g.* rectangular, objects, such as dishes and the like, with the aid of machinery. In order to make plain the invention, there is shown in the accompanying drawing by way of example, a form thereof.

Figure 1 shows in vertical section along the line I—I in Fig. 3 the device in question. Fig. 2 shows the same in lateral elevation partly in section, while Fig. 3 shows the rotatable molding disk, seen from above with certain parts removed and illustrates a slide device serving for the motion of the molding disk in a lateral direction. Fig. 4 shows a groove disk coöperating with the slide device and intended for guiding the molding disk for the purpose of molding objects of the rectangular shape shown in Fig. 3.

In a bearing 1, fastened to a table 2, or the like, there is rotatably journaled a shaft 3, which shaft can be rotated by means of a belt transmission device 4 or other suitable device. At the upper end of the shaft is mounted a sliding piece 5, which is movably arranged in guides 6, fixed to the under side of a disk 9 (the molding disk) carrying the mold 8. On the under side of the disk 9 is fixed a pin 10, which passes down into a guiding groove 11 in a groove disk 12 mounted on the upper side of the table 2. With a view to the diminution of the friction, a suitable friction roller 13 or a slide piece, running in the groove 11, may be arranged on the lower end of the pin 10. By the arrangement of the slide piece 5 and the guides 6 as well as the pin 10 and the groove 11, the molding disk 9, on the rotation of the shaft 3, will rotate with an eccentric motion, the form of which is determined by the groove 11. The procedure in the molding of objects of pottery is as follows:—A mold 8, corresponding to the object to be made, and preferably of plaster of Paris, is attached to a support 14 detachably mounted for the purpose on the molding disk 9, whereupon the plastic body of which the object 15 is to be made, having been worked up into a cake or the like, is placed on the mold 8 and is packed against it. By means of a shaper or forming piece 16, which with the aid of a bolt or the like 17 is adjustably mounted on a lever 21, which is pivotally fixed on a standard 18 by means of a pivot 19, and provided at one end with a counterweight 20, and the other end of which is fashioned into a handle 22, the forming piece (arm) 16 is pressed against the plastic mass on the mold, while the molding disk 9 is set in rotary motion, whereby the plastic mass is pressed against the molding piece 8, so that the under side of the object 15 formed by the molding is shaped exactly to the molding piece 8, while the upward facing side of the object 15 is formed to the outline of the arm 16. When the object in this manner has been fashioned to the required thickness and shape, the end of the lever 21 provided with the handle 22 is raised and the machine is stopped, whereupon the finished object is removed. The molding or forming process can then be repeated.

In order to render it possible to adjust the arm 16 in different positions in relation to the lever 21, both the lever and the arm may be furnished with lengthwise slits 24, 25, through which the screw-bolt 17 provided with a clamp nut passes down. During molding the forming piece 16 is stationary *i. e.* it is fixed in relation to the lever 21, which arrangement has proved itself to be of great advantage for the molding operation. Instead in this case the required form of the object is produced by imparting to the molding disk 9 an eccentric motion dependent on the groove 11.

By the exchange of groove disks 12 and molds 8 objects of any desired section or circumference can be molded. The shape of the groove in the groove disks can in each case be determined in the following manner: A model corresponding to the object to be molded is placed in a working position on the molding disk, whereupon the latter is rotated in such wise that the edges of the model—in the same manner as the object 15 according to Fig. 2—rest throughout against the forming piece 16. The pin 10 will then move along a curve which corresponds to the shape of the groove in the groove disk, which is to be used for the molding of an object corresponding to the model.

Having thus described my invention, I declare, that what I claim is:

1. In a molding machine, the combination of a rotatable shaft, a molding disk mounted on said shaft for rotation therewith and slidable relatively to the shaft, and removable means for guiding the disk in its sliding movement.

2. In a molding machine, the combination of a rotatable shaft, a molding disk mounted on said shaft for rotation therewith and slidable transversely thereof, a removable guide member adjacent to said disk, and means carried by the disk in contact with said guide member for directing the sliding movement of the disk during its rotation with the shaft.

In testimony whereof I have signed my name to this specification.

AXEL SAMUEL WILHELM ODELBERG.

Witnesses:
AUG. HAGELIN,
ELSA JOHANSON.